United States Patent [19]

Gastaldo et al.

[11] 4,078,421
[45] Mar. 14, 1978

[54] METHOD AND AUTOMATIC DEVICE FOR THE TESTING OF TIGHT CAVITIES

[76] Inventors: Remo Gastaldo, Via Circonvallazione 49, Mathi, Turin; Ettore Melchior, Corso Re Umberto 82, Turin, both of Italy

[21] Appl. No.: 712,786
[22] Filed: Aug. 9, 1976

[30] Foreign Application Priority Data

Oct. 7, 1975 Italy .............................. 69480 A/75

[51] Int. Cl.² ........................................ G01M 3/32
[52] U.S. Cl. ........................................ 73/49.2
[58] Field of Search ................... 73/40, 49.2, 49.3

[56] References Cited
U.S. PATENT DOCUMENTS 2,892,806 2/1959 Mamzic ................................ 73/40
3,465,562 9/1969 Donohoe .............................. 73/40
3,962,905 6/1976 Jouve ................................ 73/40.5

Primary Examiner—S. Clement Swisher
Attorney, Agent, or Firm—Flynn & Frishauf

[57] ABSTRACT

A method for testing tight cavities for leaks by a pressurization or depressurization technique (as herein defined), wherein a comparison is effected by means of a differential signal transmitter responsive to the difference between the pressure existing within the cavity and memorized supply pressure to the cavity, said comparison being effected by zero-setting the differential indication provided by the transmitter, independently of stabilization of the test cavity pressure, and taking the differential value of the two pressures as the initial datum or zero for verification of its increase with respect to time.

6 Claims, 3 Drawing Figures

METHOD AND AUTOMATIC DEVICE FOR THE TESTING OF TIGHT CAVITIES

FIELD OF THE INVENTION

The present invention relates to a method and apparatus for detecting possible leaks of tight cavities intended to operate both in pressure and vacuum, e.g. engine blocks, gear boxes, carburator bodies, cooler radiators, steam condensers, heat exchangers, hydraulic and/or pneumatic operative circuits and the like.

PRIOR ART

Methods and equipments for the testing of tight cavities are known which are based on the technique, of which the following is a definition, of pressurizing or depressurizing the cavity with air or other gas, or pressurizing the cavity with a liquid, memorizing the value of the fluid pressure or underpressure within the cavity, conventionally after the stabilization of same pressure, and comparing said value with the one assumed by the fluid pressure or depressure within the cavity after a determined time period to obtain a differential indication proportional to the fluid leak at the cavity under test.

This known method and the corresponding test equipment used to perform the method has substantial drawbacks. Firstly, a long waiting time is generally necessary for the stabilization of the pressure or underpressure value in the respective phase of pressurizing or evacuating the cavity, the greater is the capacity of the cavity the longer is said time.

In order to reduce said drawback, the cavity is generally pressurized or depressurized at a value greater than the one selected for the test, but said system reduces the stabilization time very little, both because the positive or negative overpressure is necessarily limited in order to avoid damage to the test-piece as well as excessive complication of the test equipment, and because reduction of the test pressure value requires accurate manipulation on the supply circuit valves. On the other hand, the waiting time for pressure stabilization appreciably increases the whole test duration, and this negatively affects productivity and also causes a reduction of quality of the test due to the greater influence of the errors caused by the difference between the temperature of the piece and that of the test fluid.

Another drawback of the specified known method resides in the fact that the test operation has a predetermined and constant duration both for the good testpieces, that is, the pieces without losses (which are generally most 85–99%) of the tested samples, and the defective pieces represent instead a much smaller percentage.

OBJECTS OF THIS INVENTION

An object of present invention is therefore to provide a method and test equipment which avoids or minimises the above said drawbacks.

Another important object of present invention is to provide a method and a device for the test of tight cavities by pressurization of gas or liquid, or by depressurisation as specified, permitting a remarkable reduction of the whole test time, due to the elimination or at least an appreciable reduction of the waiting time necessary for pressure stabilization during the respective cavity filling or vacuum forming phase of the test.

Another particular object of the invention is to provide a test method which, consequent to the reduction of the overall test duration, allows the use of measuring means having a higher sensitivity, giving substantial advantage in the reliability of the test.

A further important object of the invention is to provide a method and apparatus permitting a remarkable reduction of the test time for the satisfactory workpieces, thereby allowing a considerable corresponding reduction of the time necessary to sample a plurality of pieces.

BRIEF SUMMARY OF THE INVENTION

According to one aspect of the present invention, there is provided a method for testing tight cavities for leaks by a pressurization or depressurization technique (as herein defined), wherein a comparison is effected by means of a differential signal transmitter responsive to the difference between the pressure existing within the cavity and the memorized supply pressure to the cavity, said comparison being effected by zero-setting the differential indication provided by the transmitter, independantly of stabilization of the test cavity pressure, and taking the differential value of the two pressures as the initial datum or zero for verification of its increase with request to time.

According to a second aspect of the invention, there is provided automatic testing apparatus comprising a fluid feeding circuit with a principal branch carrying on/off valves across which there is shunted a measuring circuit including a differential signal transmitter and a circuit assembly having zero-setting means sensitive to the pressure difference signalled by the transmitter at the beginning of a measurement cycle.

BRIEF DESCRIPTION OF DRAWINGS

Further features and advantages of the method and device according to the invention, will appear from the detailed following description of a non-limiting example, referring to the accompanying drawings, wherein.

DESCRIPTION OF EMBODIMENTS

Figure 1:
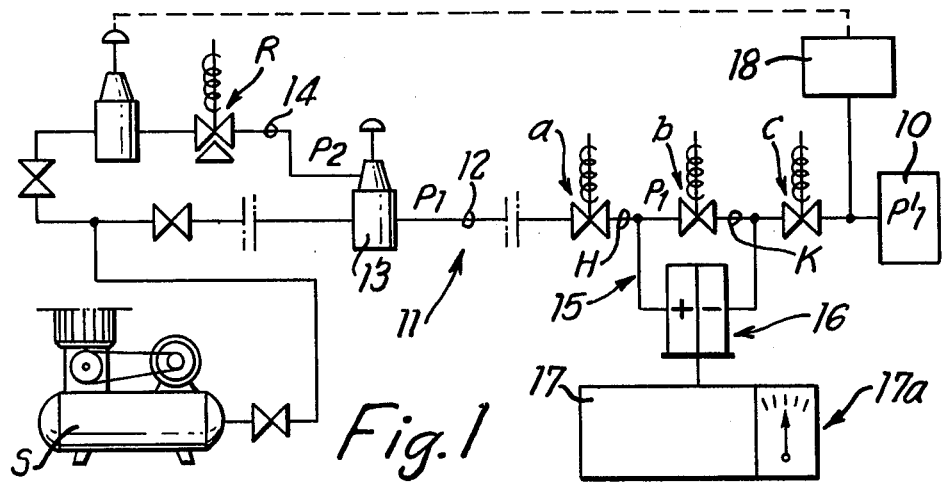
FIG. 1 is the diagram of test equipment for carrying out of the testing method according to the invention.

With reference to FIG. 1, reference 10 generally indicates the cavity to be tested for possible leaks, and 11 is the test equipment. Said equipment essentially comprises a main duct 12 connected to a pressurized fluid source S, e.g. an air source, to supply the cavity 10 with said fluid at a test pressure $P_1$, under the control of a pressure regulator 13. Preferably, a secondary circuit 14 is connected to the operable membrane of regulator 13, in order to increase the filling pressure to a value $P_2$ higher than the test value $P_1$, whereby to reduce the cavity filling time.

Three electro-valves $a$, $b$, $c$ are located in spaced positions on the duct 12 to define two duct sections H, K across which a measuring circuit 15 is connected in parallel, the measuring circuit 15 including a differential signal transmitter 16 and an associated circuit combination including an automatic zero setting circuit.

The filling pressure $P_1$ is memorized in the duct section H, while duct section K is capable, through the electro-valve c, of connecting the cavity 10 with the differential transmitter 16, in order to effect the desired comparison of the pressures, as it will more fully described later.

For control of the filling overpressure $P_2$, there is arranged downstream of the valve c, a pressure switch 18 interlocked with an electro-valve R located in the secondary circuit 14. For said control of the overpressure, it is advantageous to use a control signal which is proportional to the test fluid delivery rate, as will be made clear hereinafter.

The zero-setting circuit is adapted to effect zero setting of the differential signal even if the transmitter 16 detects any pressure difference between sections H and K of the duct 12, after the valves a and b have been closed for the memorization step and the valve c has been opened for the comparison step. The same zero-setting circuit serves also to compare possible repetitive errors in the zero setting of the differential transmitter.

The test indication therefore starts from zero, whatever may be the pressure $P_1$ reached by the fluid within the cavity 10 when the filling and pressurizing step terminates. This permits a remarkable reduction or even the elimination of the waiting time necessary for stabilization of the pressure in the feeding duct 12 and the cavity 10 which is being tested.

In particular, the filling and pressurizing of the cavity 10 may be suspended when the delivery rate in duct 12 decreases beyond a predetermined limit, e.g. of the 5% of the initial delivery rate.

For monitoring the delivery, the same differential transmitter 16 is utilized and the valve b acts, with respect to it, as a nozzle or Venturi meter.

In the pressurizing step, an instrument 17a associated with circuit 17, directly connected to the transmitter 16 (for example by means of a commutator for exclusion of the zero-setting circuit) therefore provides an indication, in terms of delivery rate, and when the indication reaches a predetermined limit, the operator can suspend fluid delivery and begin the test.

It is also foreseen that the indication corresponding to the lowest delivery reached may act directly on the electro-valves a, b, c to cut the supply of test fluid and memorize the feeding pressure $P_1$ in the duct section H. Alternatively, as previously mentioned, the lowest delivery indication may act directly on the electro-valve R in order to interrupt, by means of the regulator 13, the supply overpressure, and allow the beginning of the stabilization. However, the beginning of the test may occur even without awaiting stabilization of the pressure, by inserting the zero-setting circuit, whatever may be the indication provided by the transmitter 16, but within the sensitivity limits of said circuit, thus zero-setting the signal and compensating as already said for possible zero-setting errors of the transmitter.

The test is therefore effected with reference to the indication provided by the instrument starting from initial instant of zero-setting. The resulting indication is proportional to loss of fluid, if any, from the test cavity 10. The test duration time is predetermined and selected, for example with reference to the initial value of pressurization, the capacity of the cavity 10, and with reference to the grade of tightness required for the cavity 10. By expressing the actual test time resulting in a certain pressure loss as a percentage of a predetermined maximum duration, it is possible to plot a reject limit curve as a function of the transmitter output signal amplitude.

Figure 3:
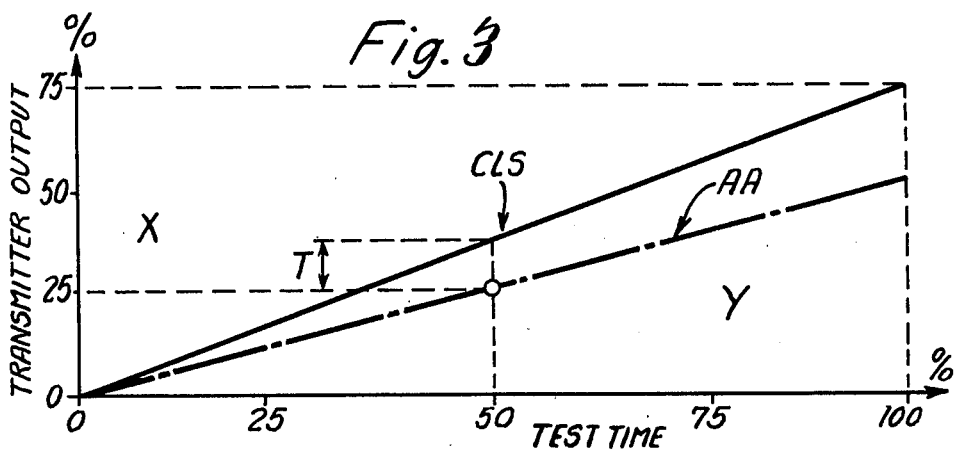
FIG. 3 is a graph illustrating the calibration curve for the reject limit and the advanced acceptance curve expressed as a test duration percentage.

On the graph of FIG. 3, wherein for example, the ordinates are expressed as a percentage of the instrument scale bottom indication, said curve indicated by CLS is drawn as a full line. It divides the plane of the graph into two parts and the lower one is the zone of the points representing, in the considered time, the values for the test pieces whose behaviour is acceptable, while the upper zone contains points corresponding to indications of pieces to be rejected.

In the lower part Y of the graph, it is therefore possible to insert thresholds which may be calibrated, always lower than the reject limit curve value, so that it becomes possible to plot a curve AA, which will be named an advanced acceptance curve, containing the points of said thresholds. In the example illustrated, the reject limit curve is represented by a straight line passing from the origin through a reject limit point with a loss at the end of test duration causing an output from the transmitter indicating 75%.

In the conditions of example, if the indication of the 75% is reached before the termination of the test (100% of the predetermined maximum test duration) the reject is decided without awaiting the end of said duration. If on the contrary, the piece being tested has no loss or has a loss whose value is within the pre-established tolerance, it will be sufficient to ascertain that, in a pre-established partial time, the instrument indication is below or on the advanced acceptance curve; e.g. an indication of 25% with respect to a value of 50% of the maximum test duration.

The actual test time may thus be appreciably shortened for the acceptable pieces, which may be considered as such at an advanced time.

The zero-setting circuit must be so arranged as to be sensitive to the transmitter output signal and to provide an equal and opposed zero-setting voltage.

Figure 2:
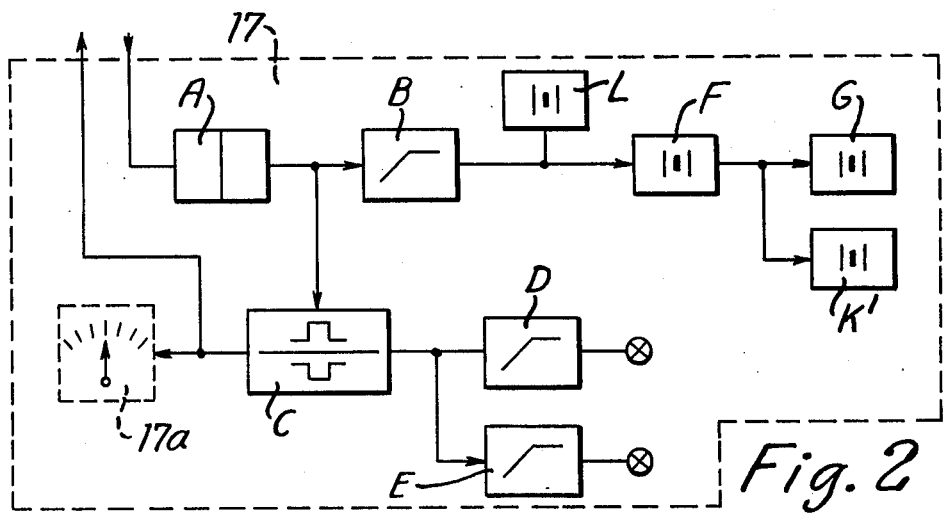
FIG. 2 is a block diagram of the circuit assembly associated to a differential signal transmitter shown in FIG. 1.

FIG. 2 shows a diagram of the circuit combination 17, which will preferably include the following function blocks;

analogue/digital transducer A with an output digital indicator, for conversion of the analogue signal provided by the differential transmitter 16 into a digital signal;

an electronic circuit B sensitive to the differential signal emitted by transmitter 16 to provide an indication concerning the delivery. Said circuit will be advantageously provided with an intervention threshold, which through a power circuit acts on the electro-valves in the duct 12 or on electro-valve R to interrupt the delivery of test fluid when the delivery rate falls beyond a predetermined and calibrable value;

a zero-setting circuit C which memorizes the differential signal from the transmitter 16 to produce a corresponding zero-setting voltage; said circuit initiating its operation at the beginning of the test duration;

an adjustable threshold circuit D for the reject limit indication;

a further E circuit, also with an adjustable threshold for the signalling of advance acceptance, sensitive to the slope of the transmitter analogue signal and adapted to produce an acceptance signal if the reject limit T (FIG. 3), in the considered time, is lower than a predetermined and adjustable value;

a timer F for the adjustment of the pressure stabilization limit time;

a timer G for the adjustment of the test duration;

a timer $K^1$ for the said circuit E insertion control;

a timer L which produces a reject signal if the pressurization (or depressurization) does not occur within determined limits.

Of course, keeping unchanged the principle of the invention, the details of practice thereof and the embodiments described may be widely varied without departing from the scope of the invention as defined in the appended claims.

We claim:

1. Automatic testing apparatus for testing tight cavities for leaks by a pressurization or depressurization technique, comprising:

a fluid feeding circuit having a principal branch connected to the test cavity, on/off valve means in said principal branch, and a measuring circuit shunt connected across said on/off valve means, said measuring circuit including a differential signal transmitter and a zero-setting means connected to said transmitter, said zero-setting means being responsive to the pressure difference signal emitted by said transmitter when said on/off valve means are operated at the beginning of a measurement cycle for zero-setting said transmitter.

2. A method for testing tight cavities for leaks by a pressurization or depressurization technique, comprising:

determining, by means of a differential signal transmitter, the difference between the pressure existing within the cavity and a memorized supply pressure to the cavity;

zero-setting the differential indication provided by said transmitter, independently of stabilization of the test cavity pressure;

verifying the increase of said pressure difference with respect to time using the differential value of the two pressures before said zero-setting as the initial datum for said verification;

measuring by means of said transmitter the test fluid delivery rate for rapid control of the filling or depressurizing of the test cavity; and interrupting the test fluid delivery to initiate a test operation when said transmitter indicates a decrease in the delivery rate below a predetermined adjustable preset value.

3. A method according to claim 2, comprising generating by said transmitter a signal indicating a delivery rate value below said adjustable preset value; and automatically interrupting the fluid supply or evacuation responsive to said signal indicating a delivery rate value below said adjustable preset value.

4. A method for testing tight cavities for leaks by a pressurization or depressurization technique, comprising:

determining, by means of a differential signal transmitter, the difference between the pressure existing within the cavity and a memorized supply pressure to the cavity;

zero-setting the differential indication provided by said transmitter, independently of stabilization of the test cavity pressure;

verifying the increase of said pressure difference with respect to time using the differential value of the two pressures before said zero-setting as the initial datum for said verification; and linearly calibrating and plotting the output of said transmitter as a function of the test time to define a first curve representing the limit of test piece acceptance, and locating a second curve in the area of the graph below said first curve which represents the limit of advanced acceptance formed by the points representing the thresholds of the transmitter output values for test-pieces whose acceptability may be determined before the termination of test a maximum duration.

5. Apparatus according to claim 1 wherein said on/off valve means comprises a plurality of valves.

6. Apparatus according to claim 1 wherein said on/off valve means comprises at least three on/off valves series connected in said principal branch, said differential signal transmitter having first and second inputs, said first input of said transmitter being connected between a first and a second of said valves, and the second input of said transmitter being coupled between said second and a third of said valves.

* * * * *